United States Patent [19]
Björklund et al.

[11] Patent Number: 5,694,306
[45] Date of Patent: Dec. 2, 1997

[54] METHOD AND DEVICE FOR CONTROL OF A SERIES-COMPENSATED CONVERTER STATION

[75] Inventors: Per-Erik Björklund, Bjursås; Tomas Jonsson, Grängesberg, both of Sweden

[73] Assignee: Asea Brown Boveri AB, Västerås, Sweden

[21] Appl. No.: 538,208

[22] Filed: Oct. 3, 1995

[30] Foreign Application Priority Data

Oct. 13, 1994 [SE] Sweden ................................ 9403488

[51] Int. Cl.$^6$ ................................................ H02J 3/36
[52] U.S. Cl. ................................................ 363/35; 363/51
[58] Field of Search ............................ 363/35, 37, 51, 363/52

[56] References Cited

U.S. PATENT DOCUMENTS

| | | | |
|---|---|---|---|
| 4,210,956 | 7/1980 | Watanabe | 363/51 |
| 4,264,951 | 4/1981 | Konishi et al. | 363/35 |
| 4,459,492 | 7/1984 | Rogowsky | 363/35 X |
| 4,672,519 | 6/1987 | Liss | 363/35 |

OTHER PUBLICATIONS

A Technical Assessment of Artificial Commutation of HVDC Converters with Series Capacitors; Reeve et al.; IEEE Trans Pwr App/Systems; vol. Pas-87, No. 10; Oct. 68; pp. 1830-1840.

Power Transmission by Direct Current; Uhlmann; Springer-Verlag Berlin Heidelberg New York 1975 pp. Preface + 124-132.

High Power Electronics HVDC and SVC; Ekstrom; Royal Institute of Technology; Jun. 1990; pp. 7-13-7-16.

*Primary Examiner*—Peter S. Wong
*Assistant Examiner*—Y. J. Han
*Attorney, Agent, or Firm*—Watson Cole Stevens Davis, P.L.L.C.

[57] ABSTRACT

Control equipment (CE1) generates an ordered value (AOL) of a control angle ($\alpha$) in dependence on a limiting signal (AMINL, AMAXL), capable of being influenced, for a converter included in a series-compensated converter station. A calculating value (AFIRL) of a control angle is calculated continuously according to a predetermined relationship (H'1, H'2) which at least approximately imitates a relationship according to which, at a firing voltage (Ufir) for the valves of the converter equal to a preselected value (Uvref), said control angle is a function (G'0) of a current (Id1) and a voltage (Un1) in the converter station and the limiting signal is formed in dependence on the calculating value. (FIG. 5)

20 Claims, 4 Drawing Sheets

METHOD AND DEVICE FOR CONTROL OF A SERIES-COMPENSATED CONVERTER STATION

TECHNICAL FIELD

The present invention relates to a method for control of a series-compensated converter station in rectifier operation, included in an installation for transmission of high-voltage direct current, and to a device for carrying out the method.

By a series-compensated converter station is meant in this connection a converter station, the converter bridges of which are connected to an alternating-voltage network via series capacitors, possibly with an intermediate transformer.

BACKGROUND ART

An installation for transmission of high-voltage direct current between two alternating-voltage networks comprises two converter stations, each one connected on its ac side to a separate one of the alternating-voltage networks, and a common dc connection. The dc connection may be in the form of an overhead line and/or a cable and also in certain parts consist of ground or water instead of a metallic conductor. In certain cases the converters are erected in the immediate vicinity of each other, so-called back-to-back erection, whereby the dc connection may consist of short busbars. Each one of the converter stations comprises a converter, usually at least one converter transformer for connection of the converter to the alternating-voltage network, as well as shunt filters for generation of reactive power and filtering of harmonics. The converters are normally line-commutated, current-source converters, by which is to be understood that the current commutation between the valves of the converters takes place by means of voltages occurring in the alternating-voltage network, and that the dc connection, viewed from the converters, occurs as a stiff current source. For the purpose of reducing the harmonics generated by the converters, especially the 5th and 7th harmonics, each one of the converters usually consists of two mutually series-connected six-pulse bridges, each one connected to the alternating-voltage network via a separate secondary winding on the converter station, the transformer being connected such that the secondary windings have a mutual phase shift of 30°.

During normal operation, one of the converters, hereinafter referred to as the rectifier, operates in rectifier operation, and the other, hereinafter referred to as the inverter, operates in inverter operation. Control equipment for the respective converter generates a control signal corresponding to a control angle α at which firing pulses are applied to the valves of the converters. For the purpose of minimizing the consumption of reactive power by the converters, and reducing the stresses on components included in the converter stations, it is advantageous to control the rectifier with the smallest possible control angle α and to control the inverter with a control angle which results in the smallest possible extinction angle γ (margin of commutation) without jeopardizing the controlled operation. The control system of the installation is, therefore, usually designed such that the inverter is controlled to a suitable maximum direct voltage for the operating conditions of the installation, taking into consideration safety margins with respect to commutating errors, voltage variations on the ac network, and other deviations from nominal operation which may occur. The rectifier is controlled in current control, the reference value of which is formed in dependence on a current order, which in turn is formed in dependence on a power order and the prevailing direct voltage in such a way that the direct current and hence the transferred active power remain at a desired value.

To ensure that the valve, at the moment of firing, has sufficient firing voltage, that is, forward voltage in blocked state, the control equipment of the rectifier further comprises a lower limitation of the control angle such that its minimum value is not lower than a preselected lowest value. This limitation is conventionally achieved by sensing the voltage across the valve with a measuring device, whereby firing pulse for the valve is generated only when the sensed voltage exceeds a pre-selected value.

Usually, the control equipment for rectifiers and inverters is designed identically, whereby in the rectifier a current controller is activated and in the inverter control equipment for a control with the aim of maintaining the extinction angle at, but not lower than, a preselected lowest value is activated.

For a general description of the technique for transmission of high-voltage direct current, reference is made to Erich Uhlmann: Power Transmission by Direct Current, Springer Verlag, Berlin Heidelberg New York 1975, in particular pages 125–136.

Between the control angle α, the extinction angle γ and the overlap angle u, the known relationship α+u+γ=180° prevails. It is thus desirable to determine the control angle for the inverter such that the extinction angle (margin of commutation) remains at a preselected lowest value.

It is known to series-compensate converter stations by connecting converter bridges, comprised in the converter station, to the respective alternating-voltage network via series capacitors. This results in several advantages. The series capacitors are charged periodically by the current traversing it and the voltage thus generated across the capacitors provides an addition to the commutating voltage across the valves of the converter. The commutating voltage becomes phase-shifted in relation to the voltages of the alternating-voltage network in such a way that, with control and extinction angles still related to the phase position for the voltages of the alternating-voltage network, the valves in rectifier operation may be controlled with control angles smaller than zero and, in inverter operation, with extinction angles smaller than zero (although the commutating margin related to the commutating voltage of the valve is, of course, greater than zero). This makes possible a reduction of the reactive power consumption of the converters. This reduces the need of generation of reactive power in the shunt filters and these may thus be dimensioned substantially based on the need of harmonic filtering. The charging current of the capacitors and hence their voltage are proportional to the direct current in the dc connection and by suitable dimensioning of the capacitors, the dependence of the overlap angle on the magnitude of the direct current may be compensated. This means that the series compensation contributes to maintain the commutating margin of the valves also in case of fast current transients. Also the dependence of the commutating margin on the amplitude of the alternating-voltage network is influenced in a favourable direction by the series compensation in that the negative current/voltage characteristic in the inverter control is influenced in a stabilizing direction and, by suitable choice of series capacitors, can also be caused to be positive.

A general description of the mode of operation of the converter station with series capacitors introduced into the ac connections between the converter transformer and a converter in a six-pulse bridge connection is given in John Reeve, John A. Baron, and G. A. Hanley: A Technical Assessment of Artificial Commutation of HVDC Converters with Series Compensation (IEEE Trans. on Power Apparatus and Systems, Vol. PAS-87, Oct. 1968, pages 1830–1840).

Thus, it is desirable in many contexts to series-compensate converter stations of the kind described above.

However, series compensation of the converter station means that the commutating voltage of the valves is dependent on both amplitude and phase for the current-dependent voltage across the respective series capacitor. During series compensation, thus, the commutating voltage of the valves cannot be directly derived from voltages sensed in the alternating-voltage network in the way which is possible in non-series-compensated converter stations, and on which the above-mentioned principles of control of the extinction angle and the firing-voltage conditions of the rectifier are based.

The smallest control angle which provides the necessary firing voltage in a series-compensated converter becomes dependent on the contribution to the commutating voltage from the voltage across the series capacitors. The capacitor voltages are dependent primarily on the current in the converter but also on the voltage of the alternating-voltage network. In this way, for a series-compensated converter, the smallest control angle which provides the necessary firing voltage will become dependent on these quantities.

A direct measurement of the firing voltage is rendered considerably more complicated by the introduction of series compensation, and therefore an application of the above-mentioned known method for control of the conditions of the rectifier for firing voltage in a series-compensated converter station would entail an individual measurement at each valve of its commutating voltage, which would entail a considerable complication and cost.

Limiting the lower value of the control angle to a constant value, so chosen that reliable firing would be achieved within the whole operating range of the rectifier, would mean that the advantages of the series compensation could not be utilized in full.

Further, it must always be ensured that firing of a valve takes place at a control angle which is greater than the electrical angle at which the direct voltage as a function of the electrical angle assumes its maximum value since, when firing the valve prior to this maximum point, the direct current drops with decreasing control angle, which leads to an unstable current control.

For the main circuits of the series-compensated converter stations, current/voltage equations may be set up in a known manner, with the control angle γ (related to the voltages of the alternating-voltage network), the direct current Id, the ideal no-load direct voltage Udi0 and the firing voltage Ufir of the valve (in rectifier operation) as variables. If in these equations a constant preselected value Uvref of the firing voltage is assumed, the control angle α may be calculated with the direct current and the ideal no-load direct voltage as variables.

However, in series-compensated converter stations, the current/voltage equations become considerably more complicated than in non-series-compensated ones and the calculation cannot be performed quite simply such that the control angle is explicitly solved from the equation. A calculation of the control angle based on these equations must be suitably carried out by iteration, which places heavy demands on calculation speed and/or the supply of the calculation capacity.

U.S. Pat. No. 4,210,956 describes a method for control of an installation for transmission of high-voltage direct current. According to the method, for each one of the converters included in the installation, the control angle of the converter is calculated based on given values of voltage and current at each converter in the installation. The calculation is performed by means of known relationships between current, voltage, commutating reactance and control angle with a view to achieving a situation whereby the installation in its entirety can be operated under stable conditions. The minimum permissible control angle, that is, the minimum firing voltage, and the minimum permissible extinction angle, are thus regarded as limit values in these calculations. The converters are not series-compensated and the method appears essentially to be intended for so-called multiterminal systems, in which more than two converter stations are connected to a common dc connection.

U.S. Pat. No. 4,264,951 describes equipment for control of an installation for transmission of high-voltage direct current. The equipment comprises, in addition to control means for control on constant current, constant voltage and constant extinction angle, also a device which, based on applied values of an alternating voltage and an alternating current sensed at the converter, calculates the limit values for the control angle of the converter at which limit values the losses in the damping circuits of the converter valves amount to a certain value. Output signals from the mentioned devices are supplied to a selector means in which a control-angle signal is selected from any of the mentioned control means while taking into consideration that the calculated limit values are not exceeded.

SUMMARY OF THE INVENTION

The object of the invention is to provide a method of the kind described in the introduction, which permits a control of the rectifier, which is simple and satisfactory from a technical and economic point of view, without sensing of commutating voltages occurring across the valves, and a device for carrying out the method.

In this way, the advantages of the series compensation can be made use of without having to carry out the technically complicated and costly measurement of commutating voltage and extinction angle individually across each one of the valves of the converter bridges.

What characterizes a method and a device according to the invention will become clear from the appended claims.

Advantageous improvements of the invention will become clear from the following description and claims

BRIEF DESCRIPTION OF THE DRAWINGS

The invention will be explained in greater detail by description of embodiments with reference to the accompanying drawings, wherein FIG. 1 schematically shows an installation for transmission of high-voltage direct current with series-compensated converter stations.

DESCRIPTION OF THE PREFERRED EMBODIMENTS

The following description relates both to the method and to the device, and the figures can thus be regarded both as signal flow diagrams and block diagrams of devices. The expressions "calculating value" and "signal" are therefore used synonomously.

It is assumed in the following that the control angle α, the angle when commutation is started, and the extinction angle γ, the angle when commutation is terminated, are related to the voltages of the respective alternating-voltage network in a conventional manner. By commutating margin γm is meant the extinction angle related to the commutating voltage across a valve in a converter bridge. For a non-series-compensated converter station, the extinction angle γ is thus equal to the commutating margin γm, whereas for a series-compensated converter station the extinction angle γ generally deviates from the commutating margin γm and may also assume values less than zero.

Figure 1:
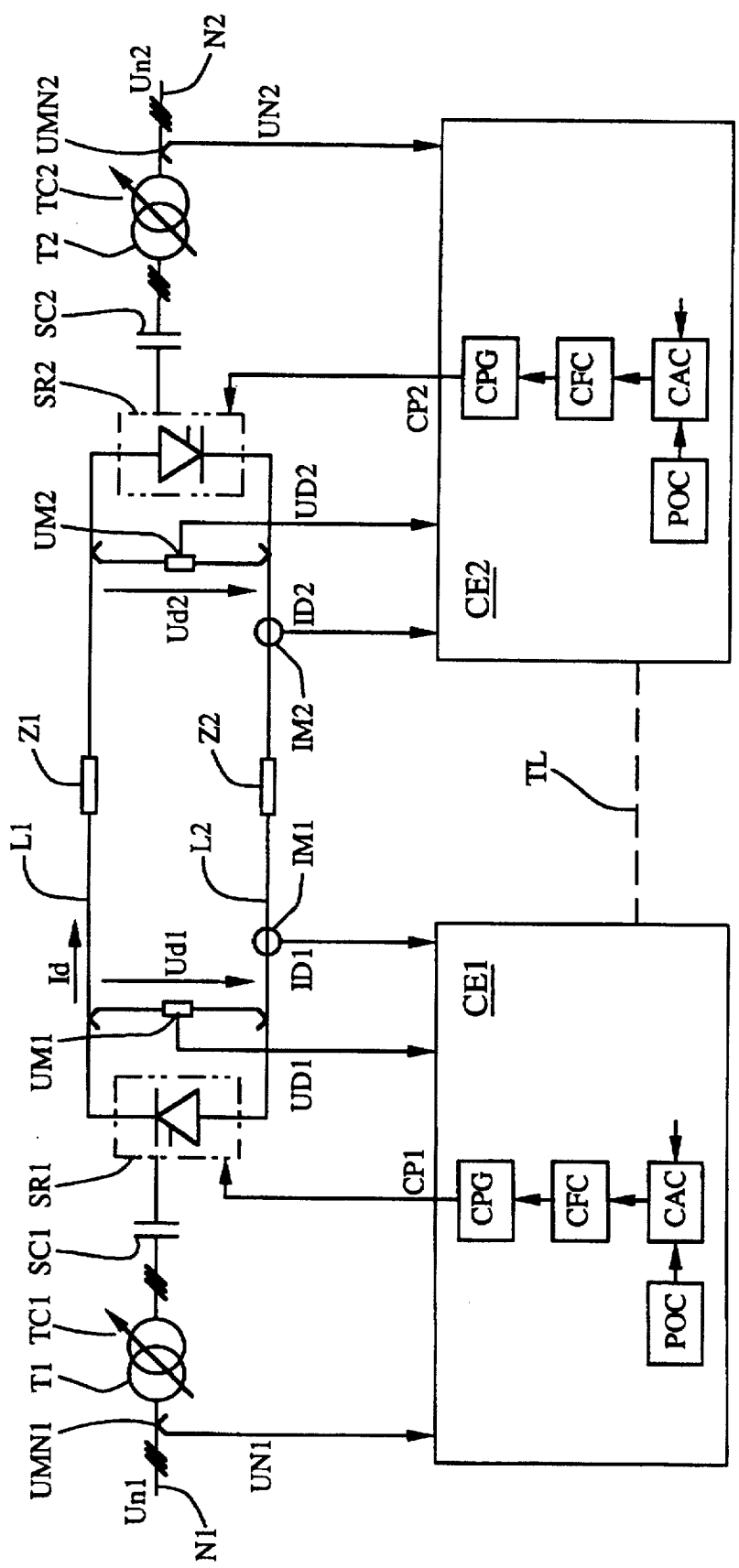

FIG. 1 shows an installation for transmission of high-voltage direct current between two three-phase alternating-voltage network N1 and N2, only roughly indicated.

A converter SR1 is connected with its alternating-voltage terminals to the network N1 via series capacitors SC1 and a transformer T1 and a converter SR2 is connected with its alternating-voltage terminals to the network N2 via series capacitors SC2 and a transformer T2. Each one of the transformers is equipped with a tap-changer TC1, TC2, respectively, marked with an arrow in the figure. A dc connection L1, L2 connects the direct-voltage terminals of the converter SR1 to the corresponding direct-voltage terminals on the converter SR2. The impedances of the dc connection are designated Z1, Z2, respectively. Further, shunt filters (not shown in the figure) for generation of reactive power and filtering of harmonics are connected to the respective alternating-voltage network.

For the description of the embodiment it is assumed that the converter SR1 operates as a rectifier and the converter SR2 operates as an inverter, but both converters are adapted to be able to operate in a known manner both as rectifiers and inverters.

Figure 2:
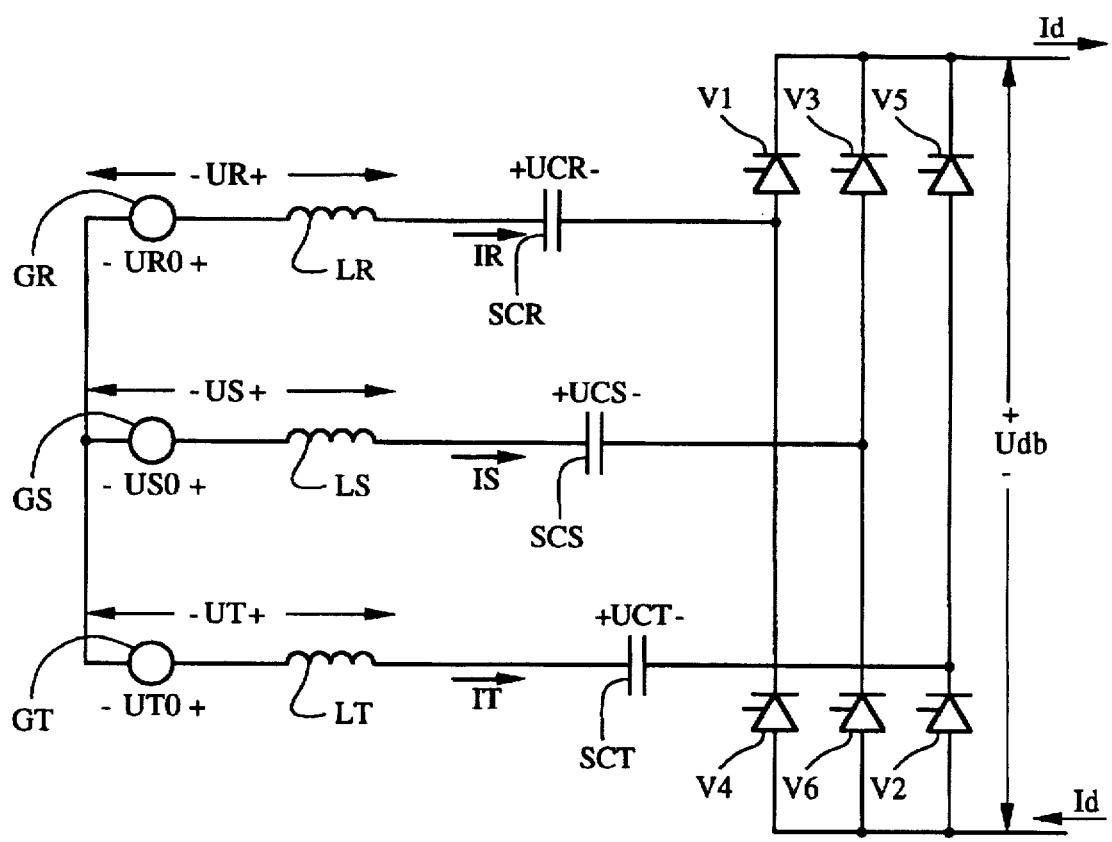
FIG. 2 shows a converter bridge connected via series capacitors to a three-phase alternating-voltage network.

The converters may be designed in a known manner as two series-connected 6-pulse bridges to form a 12-pulse connection, whereby each of the transformers comprises two secondary windings with a mutual phase shift of 30°, for example one secondary winding in Y connection and one secondary winding in Δ connection. FIG. 2 shows a six-pulse bridge, comprising six mutually identical valves V1-V6, shown as thyristors in the figure, connected on the alternating-voltage side via series capacitors SC1R, SC1S, SC1T to a three-phase network comprising three voltage generators GR, GS, GT in series connection with three inductors LR, LS, LT, respectively, which network constitutes an equivalent circuit for the above-mentioned transformer, shunt filter and alternating-voltage network.

During, for example, commutation from the valve V1 to the valve V3, the commutating voltage UKV=US−UCS−UR+UCR.

The direct voltage across the six-pulse bridge is designated Udb and in the event that the converter comprises two series-connected six-pulse bridges, the direct voltage of the converter, designated Ud, becomes equal to two times Udb.

Each converter is equipped with a piece of control equipment CE1, CE2, respectively (FIG. 1). Each one of the pieces of control equipment comprises a control angle unit CAC for forming an ordered value of the control angle α, which control angle unit will be described in greater detail below, units CFC designed in a manner known per se for determining the firing moment of the respective valve in dependence on the ordered value of the control angle α, and CPG for generating control pulses CP1 and CP2, respectively, to the valves included in the converters at the firing moment. From a power control unit POC, the control angle unit CAC is supplied with a reference value for active power, which reference value is formed in a manner known per se. The control angle unit may also be supplied with other reference values from superordinate control systems, not shown in the figure, for example for control of reactive power exchange with the alternating-voltage networks.

The direct voltage Ud1 of the rectifier and the direct voltage Ud2 of the inverter are measured by means of voltage-measuring devices UM1, UM2, respectively, which deliver the measured values UD1 and UD2, respectively. The current Id through the dc connection is measured by means of current measuring devices IM1, IM2, respectively, which deliver the measured values ID1 and ID2, respectively. The voltages Un1 and Un2, respectively, of the alternating-voltage networks are measured by means of voltage-measuring devices UMN1 and UMN2, respectively which deliver the measured values UN1 and UN2, respectively.

The pieces of control equipment of the converters are supplied with the above-mentioned measured values of the operating parameters of the installation, that is, the control equipment of the rectifier is supplied with measured values for the voltage of the alternating-voltage network, for the direct voltage of the rectifier, and the direct current in the dc connection, and the control equipment of the inverter is supplied with corresponding measured values relating to the inverter. In addition, the pieces of control equipment are supplied (in a manner not shown in the drawings but known per se) with input signals with information about the position of the tap-changers and a power-direction signal RECT/INV, the latter signal indicating rectifier operation and inverter operation, respectively, and being determined in dependence on the power direction requested by the operator of the installation.

In dependence on measured values and input signals supplied to the pieces of control equipment, the pieces of control equipment of the rectifier and the inverter generate control pulses CP1 and CP2, respectively, for the valves of the converters and supply these to the respective valve.

The two pieces of control equipment communicate with each other, in a manner known per se, via a telecommunication link TL for two-way transmission of information about the operating parameters of the converters.

The respective control equipment may also comprise a tap-changer control unit, not shown in the figure but designed in a manner known per se, for generation of INCREASE/DECREASE impulses for the tap-changers, which impulses are supplied to the operating equipment of the tap-changers.

Figure 3:
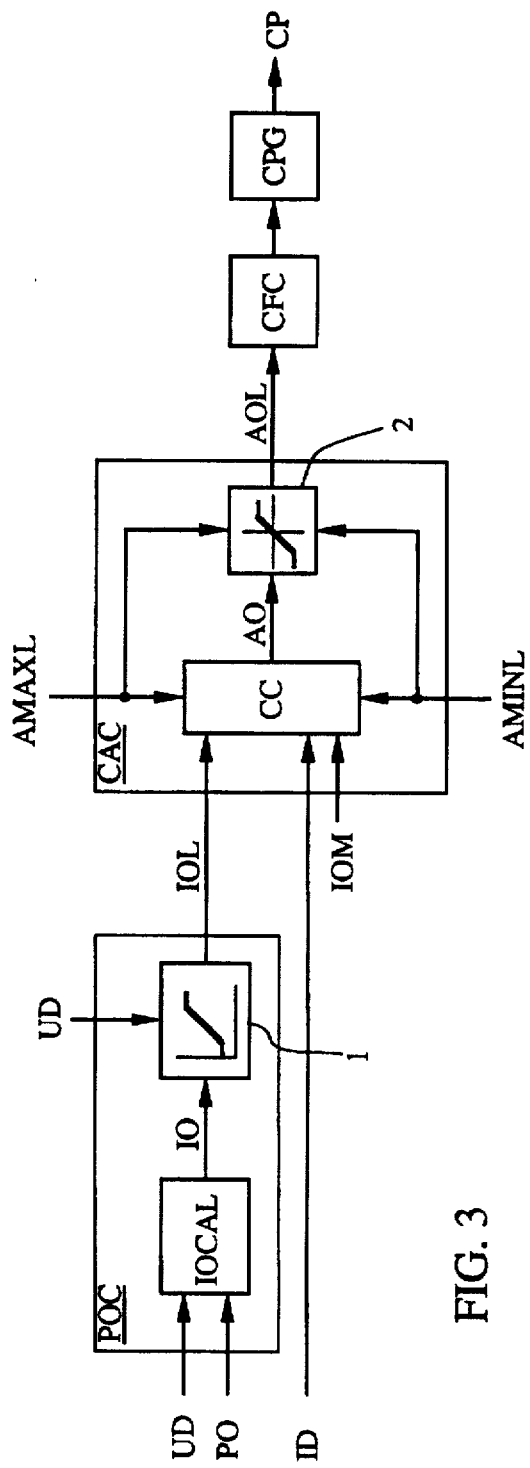
FIG. 3 shows in the form of a block diagram parts of control equipment for the converter stations according to FIG. 1 in one embodiment of the invention

FIG. 3 shows parts of a piece of control equipment for the converter stations according to FIG. 1, in one embodiment of the invention. The pieces of control equipment are usually designed identically for both rectifiers and inverters, and therefore in FIG. 3 and the subsequent FIG. 4, indices 1 and 2, respectively, for indicating quantities relating to a rectifier and an inverter are not indicated.

The power control unit POC comprises a calculating member IOCAL for calculating a current order IO as the quotient between a power order PO for transferred active power in the dc connection and a measured value UD1 of the direct voltage Ud1 in the rectifier. The current order is supplied to a limiting member 1 for limiting the current order in dependence on the measured value UD1 of the direct voltage Udl, supplied to the above-mentioned limiting member. The output signal IOL from the limiting member 1 is thereafter supplied to a current controller CC comprised in the control angle unit CAC as reference value for this controller.

The output signal AO of the current controller is limited to its minimum and its maximum value in a limiting member 2 by means of a first limiting signal AMINL and a third limiting signal AMAXL, respectively, both of these limiting signals being capable of being influenced. The output signal AOL from the limiting member 2, which thus is an ordered value of the control angle $\alpha$, is supplied to the unit CFC for determining the firing moment of the respective valve.

Figure 4:
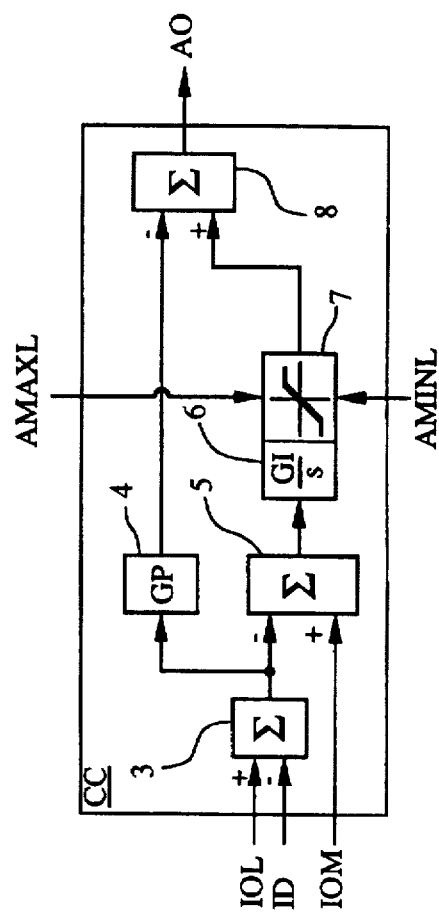
FIG. 4 shows in the form of a block diagram an embodiment of a current controller for control equipment according to FIG. 3.

FIG. 4 shows an embodiment of the current controller CC which is known per se. A first summator 3 forms as output signal the difference between the reference value IOL for the direct current Id and the measured value ID of this current. The difference is supplied to a proportional-amplifying member 4 with a gain GP and to a summator 5. The summator 5 is also supplied with a preselected current margin IOM between the rectifier and the inverter, and thus forms as output signal the difference between the current margin and the output signal from the first summator 3. The output signal from the summator 5 is supplied to an integrating member 6 with the integration time constant 1/GI. The integrating member comprises a limiting member 7 which limits the output signal from the integrating member to its maximum and to its minimum value in dependence on the limiting signals AMAXL and AMINL, respectively. The output signals from the proportional-amplifying member 4 and the integrating member, limited by the limiting member 7, are supplied to a third summator 8, which as output signal forms the output signal AO of the current controller as the difference between the output signal from the integrating member and the output signal from the proportional-amplifying member.

The current orders and the current margins for the rectifier and the inverter are synchronized via the telecommunication link TL.

The current margin IOM is usually equal to zero for the rectifier and for the inverter it is set at a value different from zero and with such a sign that the control equipment of the inverter strives to reduce the direct current controlled by the rectifier.

Figure 5:
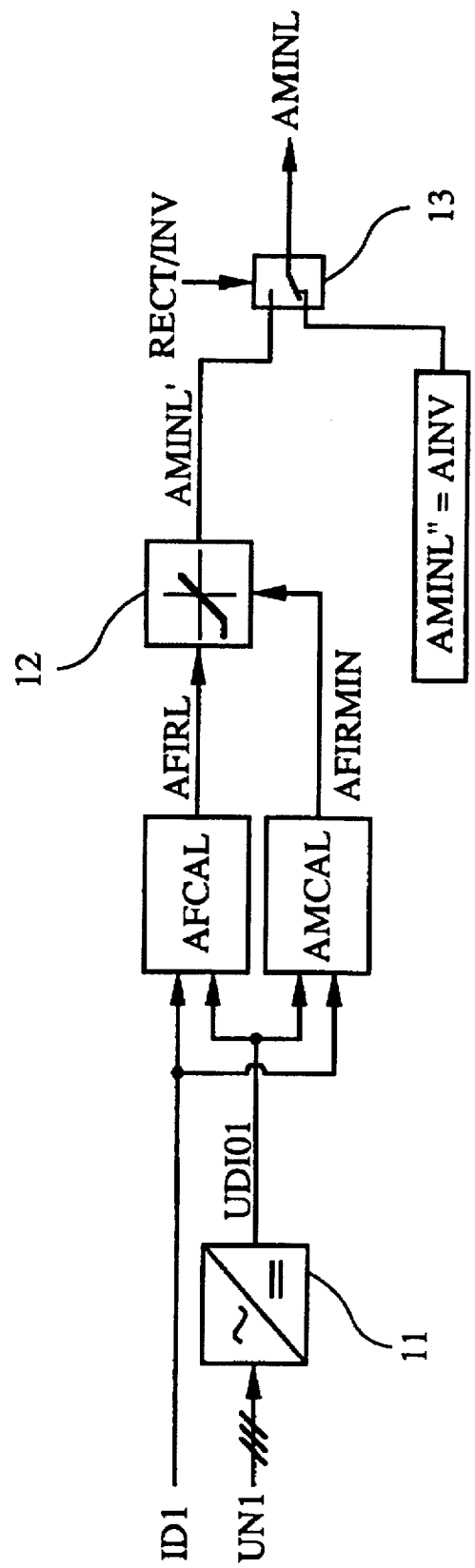
FIG. 5 shows in the form of a block diagram a limitation of the minimum control angle for control equipment according to FIG. 3, in one embodiment of the invention.

FIG. 5 shows how the limiting signal AMINL is formed in an advantageous embodiment of the invention. A selector 13, controlled by the signal RECT/INV, selects in dependence on this signal the limiting signal AMINL as either of a limiting signal AMINL' relating to rectifier operation and a limiting signal AMINL" relating to inverter operation. The limiting signal AMINL is supplied to the limiting member 7, comprised in the integrating member of the current controller, and the limiting member 2 of the control angle unit CAC.

In inverter operation, the limiting signal AMINL" is set at a constant value AINV, typically of the order of magnitude of 95°.

In rectifier operation, the purpose of the limiting signal AMINL is to ensure that firing of a valve takes place at a control angle which is greater than the electrical angle at which the direct voltage as a function of the electrical angle assumes its maximum value and that firing is not ordered before the valve has the necessary firing voltage Ufir. A first calculating member AFCAL forms an output signal AFIRL as a first calculating value of the control angle corresponding to a preselected minimum firing voltage Uvref according to a certain relationship H', of which some embodiments will be described in greater detail below. A second calculating unit AMCAL forms a second limiting signal AFIRMIN as a calculated value of the control angle which corresponds to maximum direct voltage Udmax for the rectifier according to a certain relationship H", of which some embodiments will be described in greater detail below. The output signal AFIRL is supplied to a limiting member 12, which limits the signal AFIRL to a lower limiting value in dependence on the limiting signal AFIRMIN. The output signal from the limiting member 12 constitutes the above-mentioned limiting signal AMINL".

For the main circuits of the series-compensated converter station in rectifier operation, current/voltage equations may be set up in a manner known per se with the control angle $\alpha$ (related to the voltages of the alternating-voltage network), the direct current Id1, the ideal no-load direct voltage Udi01 and the firing voltage Ufir of the valve as variables. If in these equations a constant preselected value Uvref of the firing voltage of the valve is assumed, the control angle $\alpha$ can be calculated, suitably iteratively, with the direct current and the ideal no-load direct voltage as variables. In formal terms, this can be expressed such that the control angle is a function G'0 of the direct current Id1 and the ideal no-load direct voltage Udi01 at a firing voltage for the valves equal to the preselected value Uvref, $\alpha$=G'1 (Id1, Udi01, Uvref).

In similar manner, a value of the direct voltage of the converter, equal to its maximum value Udmax, may be assumed in the current/voltage equations of the main circuits, and a control angle $\alpha_{Udmax}$ may be calculated which corresponds to the maximum voltage mentioned. In formal terms, this may be expressed such that the control angle is a function of the direct current Id1 and the ideal no-load direct voltage Udi01 at a voltage for the rectifier equal to the value Udmax. Since at this voltage the rate of change of the voltage of the rectifier with respect to the control angle, dUd1/d$\alpha$, is equal to zero, the control angle for this case may be expressed as a function G"0 of the direct current Id1, the ideal no-load direct voltage Udi01 and the derivative dUdl/d$\alpha$, $\alpha_{Udmax}$=G"0(Id1, Udi01, dUd1/d$\alpha$=0).

The calculating unit AFCAL is supplied with a measured value ID1 of continuously sensed values of the direct current Id1 and a voltage value UDI01 of the ideal no-load direct voltage, formed in dependence on continuously sensed voltage values in the alternating-voltage network N1. By comprising in the calculating unit calculating members adapted to continuously calculate the control angle according to a relationship H'0, according to which the control angle is the above-mentioned function G'0, and by limiting the control angle for the respective valves of the rectifier to a lower limiting value equal to the above-mentioned calculated value, the valves of the rectifier bridges will thus operate with a firing voltage equal to or greater than the preselected value Uvref for varying values of the direct current and the ideal no-load direct voltage, without the commutating voltages prevailing across the respective valves being known.

The calculating unit AMCAL is also supplied with the measured value ID1 and the voltage value UDI01 and by adapting this calculating unit to continuously calculate the control angle according to a relationship H"0, according to which the control angle is the above-mentioned function G"0, and by applying to the limiting member 12 a signal corresponding to this value, the smallest value of the control angle for the valves of the rectifier bridges will thus be greater than or equal to the control angle at which the voltage of the rectifier assumes its maximum value.

The functions G'0 and G"0 are comparatively complicated and a study of representative installations has shown that a satisfactory margin for the firing voltage in series-compensated converter stations and for firing at control angles greater than that at which the voltage assumes its maximum value, respectively, may be achieved over large intervals in current and voltage even when the output signal from the respective calculating unit AFCAL and AMCAL is formed as a calculated expression according to a relationship which approximately imitates the above-described relationship G'0 and G"0, respectively. In this way, simplified functions for the dependence of the control angle on direct current and ideal no-load direct voltage may be assumed, which means that the calculating members comprised in the calculating units may be designed simpler and carry out the calculation more rapidly.

At a given choice of series capacitors, the relationship G"0 may be approximated with good accuracy with a constant preselected value, that is, the calculating unit AMCAL is adapted to form the limiting signal AFIRMIN according to a function H"1=constant=AFIRMIN1.

It has proved to be advantageous to form the limiting signal AMINL of the rectifier in dependence on the current, that is, to adapt the calculating unit AFCAL to calculate the control angle according to a linear function $\alpha$=H'1(Id1)= C1–D1*Id1, where Id1 is the direct current expressed in per unit. A study of a certain installation, where C1 has been chosen to be the value 5.7 and D1 the value 17.1 and AFIRMIN1=–8°, showed that the firing voltage of the valves incrased by only about 0.06 per unit when the direct current increased from 0.3 per unit to 0.8 per unit at the ideal no-load direct voltage 1.0 per unit, based on the nominal no-load direct voltage of the converter. However, lower direct currents in combination with lower ideal no-load direct voltages and higher direct currents in combination with higher ideal no-load direct voltages, respectively, resulted in a reduction of the firing voltage.

By forming the limiting signal AMINL of the rectifier in dependence on current and voltage, an additional improvement of the dependence of the firing voltage on the current and voltage of the converter station is achieved. The result was that the firing voltage increased by only about 0.06 per unit from its lowest value, when the direct current, at the ideal no-load direct voltage 1 per unit, increased from zero to 1.05 per unit. At the ideal no-load direct voltage 1.3 per unit, the direct current could be allowed to increase to about 1.25 per unit within the same range of variation for the firing voltage.

In this case, the calculating unit AFCAL was adapted to calculate the control angle according to a function $\alpha$=H'2 (Id1, Udi01), where Udi01 is the ideal no-load direct voltage in per unit. The function H'2 comprised a term linearly dependent on the current and a term comprising a product of the current and the voltage, H'2=6–19*Id1+16*(Id1–0.3)* (Udi01–0.9). The limiting value AFIRMIN1 was chosen to be –10°.

When the calculating unit AFCAL is adapted to calculate the control angle according to any of the above-mentioned functions H1' and H'2, it is thus continuously supplied with the measured value ID1 of the direct current Id1 and the voltage value UDI01 of the ideal no-load direct voltage Udi01, and calculates a value of the control angle in dependence on these measured values and a preselected value Uvref of the firing voltage. When the calculating unit is adapted to calculate the control angle according to the above-mentioned function H'1, it is, of course, sufficient for it to be supplied with the measured value ID1. When the calculating unit AMCAL is adapted to form the limiting signal AFIRMIN so that it is set at a constant value AFIRMIN1, it operates independently of sensed operating parameters in the converter station.

The voltage value UDI01 is formed in a manner known per se as the output signal from a rectifier 11, which rectifies the measured value UN1 of the voltage Un of the alternating-voltage network taking into consideration the current transformer ratio.

The limiting members, calculating units and function-forming members shown in the block diagrams may in applicable parts be designed as a model comprising analog and/or digital means for modelling or be designed completely or partially as calculations by means of analog and/or digital technique in hard-wired circuits, or be implemented as programs in a microprocessor.

Although FIGS. 1–2 show series capacitors connected to the converter bridges, the invention also comprises those cases where the converter bridges are connected to transformers and the series capacitors are connected between transformers and network.

Although it is advantageous to use direct current and ideal no-load direct voltage as variables in the functions G'0 and G"0, also the corresponding ac quantities at the respective converter stations may be used since between direct current and alternating current and between ideal no-load direct voltage and the voltage of the alternating-voltage network, respectively, taking into consideration the transformer ratio and the tap-changer position, relations known per se prevail. In these cases, the calculating unit may, of course, be supplied with sensed values of the above-mentioned ac quantities.

We claim:

1. A method for control in rectifier operation of a series-compensated converter station included in an installation for transmission of high-voltage direct current, said converter station comprising a converter (SR1) which is controlled by control equipment (CE1) and which is connected to a three-phase alternating-voltage network (N1) by means of series connected capacitors, the control equipment generating an ordered value (AOL) of a control angle ($\alpha$) for valves (V1–V6) included in the converter, said ordered value being limited to a lower limiting value, wherein a first control angle calculating value (AFIRL) is continuously calculated according to a predetermined relationship (H'1, H'2), which at least approximately expresses a relationship according to which the control angle, at a firing voltage (Ufir) for the valves equal to a preselected value (Uvref), is a function (G'0) of a current (Id1) and of a voltage (Un1) in the converter station, and that the lower limiting value is formed in dependence on said first control angle calculating value.

2. A method according to claim 1, wherein a second control angle calculating value (AFIRMIN) is continuously calculated according to a predetermined relationship (H"0, H"1), which at least approximately expresses a relationship according to which said control angle, when the rate of change of the voltage (dUd1/d$\alpha$) of the converter with respect to the control angle is equal to zero, corresponding to a voltage (Ud1) for the converter which is equal to the maximum value (Udmax) thereof, is a function (G"0) of a current (Id1) and of a voltage (Un1) in the converter station, and that the lower limiting value is limited to the lower value thereof, in dependence on said second control angle calculating value.

3. A method according to claim 1, wherein the lower limiting value is limited to the lower value thereof and that said lower value is a constant (AFIRMIN1).

4. A method according to claim 1, wherein the first limiting value of the control angle is calculated in dependence on a current (Id1) continuously sensed in the converter station according to a predetermined relationship (H'1) according to which the control angle is a linear function of said current.

5. A method according to claim 4, wherein the first limiting value of the control angle is calculated in dependence on a voltage (Un1) continuously sensed int he converter station according to a predetermined relationship (H'2) according to which the control angle is a function of said current and of a product of said current and said voltage.

6. A device for control in rectifier operation of a series-compensated converter station included in an installation for transmission of high-voltage direct current, said converter station comprising a converter (SR1) which is controlled by control equipment (CE1) and which is connected to a three-phase alternating-voltage network (N1) by means of series connected capacitors, the control equipment comprising a control-angle unit (CAC) for generating an ordered value (AOL) of a control angle ($\alpha$) for valves (V1–V6) included in the converter, said ordered value being limited to a lower limiting value in dependence on a first limiting signal (AMINL), wherein the control equipment comprises a first calculating unit (AFCAL) which is supplied with a measured value (ID1) of a current (Id1) continuously sensed in the converter and a voltage value (UDI01), formed in dependence on a measured value (UN1) of a voltage (Un1) continuously sensed in the converter station, and which continuously, in dependence on the measured value of said sensed current and said voltage value, calculates a first control angle calculating value (AFIRL) according to a relationship (H'1, H'2), which at least approximately expresses a relationship according to which the control angle, at a firing voltage (Ufir) for the valves equal to a preselected value (Uvref), is a function (G'0) of said sensed current (Id1) and said sensed voltage (Un1), and that the first calculating unit forms the first limiting signal in dependence on said first control angle calculating value.

7. A device according to claim 6, wherein the control equipment further comprises a limiting member (12) and a second calculating unit (AMCAL), wherein said first control angle calculating value is supplied to the limiting member for limiting the lower value thereof in dependence on a second limiting signal (AFIRMIN), capable of being influenced, and the second calculating unit (AMCAL) is supplied with a measured value (ID1) of a current (Id1) continuously sensed in the converter and a voltage value (UDI01), formed in dependence on a measured value (UN1) of a voltage (Un1) continuously sensed in the converter station, and continuously, in dependence on the measured value of said sensed current and said voltage value, calculates a second control angle calculating value (AFIRMIN) according to a preselected relationship (H"0, H"1), which at least approximately expresses a relationship according to which said control angle, when the voltage derivative (dUd1/d$\alpha$) of the converter with respect to the control angle is equal to zero, corresponding to a voltage (Ud1) for the converter which is equal to the maximum value (Udmax) thereof, is a function (Un1), and that the second calculating unit forms the second limiting signal in dependence on said second control angle calculating value.

8. A device according to claim 6, wherein the control equipment further comprises a limiting member (12), wherein said first control angle calculating value is supplied to the limiting member for limiting the lower value thereof in dependence on a second limiting signal (AFIRMIN) and that said second limiting signal has a constant value (AFIRMIN1).

9. A device according to claim 6, wherein the measured value (ID1) of the current (Id1) continuously sensed in the converter is supplied to the first calculating unit, which calculates the control angle according to a predetermined relationship (H'1) according to which the control angle is a linear function of said measured value.

10. A device according to claim 9, wherein the voltage value (UDI01) formed in dependence on the measured value (UN1) of the voltage (Un1) continuously sensed in the converter is supplied to the first calculating unit, which calculates the control angle according to a predetermined relationship (H"2) according to which the control angle is a function of said current and of a product of said current and said voltage.

11. A method for controlling rectifier operation of a series-compensated converter station in an installation for transmission of high-voltage direct current, said converter sation includes a converter (SR1) having valves with a firing voltage (Ufir) equal to a preselected reference voltage (UVref), said converter being connected to a three-phase alternating-voltage network (N1) by means of series connected capacitors, and control equipment for controlling the converter, the control equipment generating an ordered value (AOL) of a control angle ($\alpha$) for the valves (V1–V6), said ordered value being limited to a lower limiting value comprising the steps of:

continuously calculating a first control angle calculating value (AFIRL) according to a predetermined relationship (H'1, H'2), approximately expressing a relationship wherein the control angle is a function (G'0) of a current (Id1) and of a voltage (Un1) in the converter station when the firing voltage (Ufir) equals the preselected value (Uvref); and forming the lower limiting value in dependence on said first control angle calculating value.

12. A method according to claim 1 comprising the steps of:

continuously calculating a second control angle calculating value (AFIRMIN) according to a predetermined relationship (H"0, H"1), approximately expressing a relationship according to which said control angle is a function (G"0) of the current (Id1) and of the voltage (Un1) in the converter station, when the rate of change of the voltage a direct voltage (Ud1) of the converter with respect to the control angle ($\alpha$) is equal to zero, corresponding to a maximum value (Udmax) of said direct converter voltage (Ud1); and limiting the lower limiting value to a lower value thereof in dependence on said second control angle calculating value.

13. A method according to claim 11 comprising the step of:

limiting the lower limiting value to a lower value thereof and wherein said lower value is a constant (AFIRMIN1).

14. A method according to claim 11 comprising the steps of:

calculating the first limiting value of the control angle in dependence on the current (Id1); and continuously sensing said current in the converter station according to a predetermined relationship (H'1) wherein the control angle is a linear function of said current.

15. A method according to claim 14 comprising the steps of:

calculating the first limiting value of the control angle in dependence on the voltage (Un1); and continuously sensing the voltage in the converter station according to a predetermined relationship (H'2) wherein the control angle is a function of said current and is a product of said current and said voltage.

16. Apparatus for controlling rectifier operation of a series-compensated converter station adapted to be connected to a three-phase alternating-voltage network (N1) in an installation for transmission of high-voltage direct current, said converter station including:

a converter (SR1) having values operable at a firing voltage (Ufir) equal to a preselected reference value (Uvref);

series connected capacitors for connecting the converter to the network;

control equipment for controlling the converter including:

a control-angle unit (CAC) for generating an ordered value (AOL) of a control angle ($\alpha$) for the valves (V1–V6), said ordered value being limited to a lower limiting value in dependence on a first limiting signal (AMINL);

means for continuously sensing a current (Id1) and a voltage (Un1);

means for measuring a value (ID1) of said current, and a corresponding voltage value (UN1);

means for producing a voltage (UDI01) as a function of the voltage value (UN1);

a first calculating unit (AFCAL) responsive to the measured value (UDI01) and the voltage (UDI01) for continuously calculating a control angle calculating value (AFIRL) according to a predetermined relationship (H'1, H'2), approximately expressing a relationship wherein the control angle is a function (G'0) of said sensed current (Id1) and said sensed voltage (Un1), when the firing voltage (Ufir) for the valves equals the preselected value (Uvref), said calculating unit producing the first limiting signal in dependence on said first control angle calculating value.

17. Apparatus according to claim 16 wherein the control equipment further comprises:

a limiting member, responsive to said first control angle calculating value for limiting the lower value in accordance with a second limiting signal (AFIRMIN); and a second calculating unit (AMCAL) responsive to the measured value (ID1) and the voltage (UDI01) for calculating a second control angle calculating value (AFIRMIN) according to a preselected relationship (H"0, H"1) approximately expressing a relationship wherein said control angle is a function of the voltage value (UN1), when the voltage derivative (dUd1/d$\alpha$) of the converter with respect to the control angle is equal to zero, corresponding to a maximum value (Udmax) of the converter voltage, and said second calculating unit forming the second limiting signal in dependence on said second calculating value.

18. Apparatus according to claim 16 wherein the control equipment further comprises:

a limiting member responsive to said first control angle calculating value for limiting the lower value in accordance with a second limiting signal (AFIRMIN) and wherein said second limiting signal has a constant value (AFIRMIN1).

19. Apparatus according to claim 16 wherein first calculating unit is responsive to the measured value (ID1) for calculating the control angle according to a predetermined relationship (H'1) wherein the control angle is a linear function of said measured value.

20. Apparatus according to claim 19 wherein first calculating unit is responsive to the voltage (UDI01) for calculating the control angle according to a predetermined relationship (H'2) wherein the control angle is a function of said current and is a product of said current and said voltage.

* * * * *